(12) United States Patent
Higashimata (10) Patent No.: US 6,311,122 B1
(45) Date of Patent: Oct. 30, 2001

(54) VEHICULAR VELOCITY CONTROL APPARATUS TO FOLLOW UP PRECEDING VEHICLE RUNNING AHEAD OF VEHICLE

(75) Inventor: Akira Higashimata, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/556,408

(22) Filed: Apr. 24, 2000

(30) Foreign Application Priority Data

Apr. 30, 1999 (JP) .................................................. 11-123782

(51) Int. Cl.⁷ .................................................. B60K 31/00
(52) U.S. Cl. .............................. 701/96; 701/301; 342/71; 340/903; 180/179
(58) Field of Search ................................ 701/93, 96, 300, 701/301; 180/169, 170, 178, 179; 342/71, 455; 340/435, 903

(56) References Cited

U.S. PATENT DOCUMENTS

| | | | |
|---|---|---|---|
| 5,934,399 | * 8/1999 | Iiboshi et al. .......................... | 180/169 |
| 6,044,321 | * 3/2000 | Nakamura et al. ..................... | 701/96 |
| 6,154,168 | * 11/2000 | Egawa et al. .......................... | 340/903 |
| 6,161,073 | * 12/2000 | Tange et al. ............................ | 701/96 |
| 6,175,799 | * 1/2001 | Tsutsumi et al. ....................... | 701/96 |

FOREIGN PATENT DOCUMENTS 8-169252   7/1996   (JP) .

* cited by examiner

*Primary Examiner*—Gary Chin
(74) *Attorney, Agent, or Firm*—McDermott, Will & Emery (57) ABSTRACT

In a vehicular velocity control apparatus for an automotive vehicle, a first calculator is provided to calculate a target vehicular velocity to make an actual inter-vehicle distance from the vehicle to another vehicle which is running ahead of the vehicle substantially equal to a target inter-vehicle distance, a second calculator is provided to calculate a target vehicular driving force to make an actual vehicular velocity substantially equal to the target vehicular velocity, a first controller is operated to control an engine output variable of a vehicular engine to make an actual engine output variable substantially equal to the target vehicular driving force, a second controller is responsive to a negative target driving force to control a mechanical brake manipulated variable of a vehicular brake system to make a vehicular brake force substantially equal to the negative target vehicular driving force together with an operation of the first controller, a brake force integrator is provided to integrate the mechanical brake manipulated variable of the vehicular brake system with respect to a time duration, and a follow-up run release controller is provided to release a follow-up run control for the vehicle to follow up the other vehicle at the target inter-vehicle distance through the first and second controllers when an integration value of the mechanical brake manipulated variable with respect to a time duration by the brake force integrator is in excess of a preset reference value.

5 Claims, 8 Drawing Sheets

VEHICULAR VELOCITY CONTROL
APPARATUS TO FOLLOW UP PRECEDING
VEHICLE RUNNING AHEAD OF VEHICLE

BACKGROUND OF THE INVENTION a) Field of the Invention

The present invention relates to a vehicular velocity control apparatus for automatically controlling a vehicular velocity to follow up a preceding vehicle which is running ahead of the vehicle at a target inter-vehicle distance.

b) Description of the Related Art

A Japanese Patent Application First (unexamined) Publication No. Heisei 8-169252 published on Jul. 2, 1996 exemplifies a previously proposed vehicular velocity control apparatus.

In the previously proposed vehicular velocity control apparatus, a negative driving force is developed through an automatic brake system in order to make a vehicular velocity substantially equal to the target value.

SUMMARY OF THE INVENTION

When such a kind of the vehicular velocity control apparatus described above is applied to a preceding vehicle follow-up run control system which makes a follow-up run control for the vehicle to follow up a preceding vehicle which is running ahead of the vehicle, maintaining an inter-vehicle distance to the preceding vehicle constant, a control performance on the inter-vehicle distance may be applied.

However, when the previously proposed vehicular velocity control apparatus is applied to the follow-up run control system, it may be necessary to effect a vehicular brake continuously for a long period of time in order to maintain the inter-vehicle distance constant even though the vehicle is running on a descending slope for the long period of time.

It is therefore an object of the present invention to provide vehicular velocity control apparatus which can prevent a continuous operation of a vehicular brake for a considerably long period of time during an operation of the preceding vehicle follow-up run control.

The above-described object can be achieved by providing a vehicular velocity control apparatus for an automotive vehicle, comprising: a first calculator to calculate a target vehicular velocity to make an actual inter-vehicle distance from the vehicle to another vehicle which is running ahead of the vehicle substantially equal to a target inter-vehicle distance; a second calculator to calculate a target vehicular driving force to make an actual vehicular velocity substantially equal to the target vehicular velocity; a first controller operated to control an engine output variable of a vehicular engine to make an actual engine output variable substantially equal to the target vehicular driving force; a second controller responsive to a negative target driving force to control a mechanical brake manipulated variable of a vehicular brake system to make a vehicular brake force substantially equal to the negative target vehicular driving force together with an operation of the first controller; a brake force integrator to integrate the mechanical brake manipulated variable of the vehicular brake system with respect to a time duration; and a follow-up run release controller to release a follow-up run control for the vehicle to follow up the other vehicle at the target inter-vehicle distance through the first and second controllers when an integration value of the mechanical brake manipulated variable with respect to a time duration by the brake force -integrator is in excess of a preset reference value.

DETAILED DESCRIPTION OF THE PREFERRED EMBODIMENTS

Reference will hereinafter be made to the drawings in order to facilitate a better understanding of the present invention.

Figure 1A:
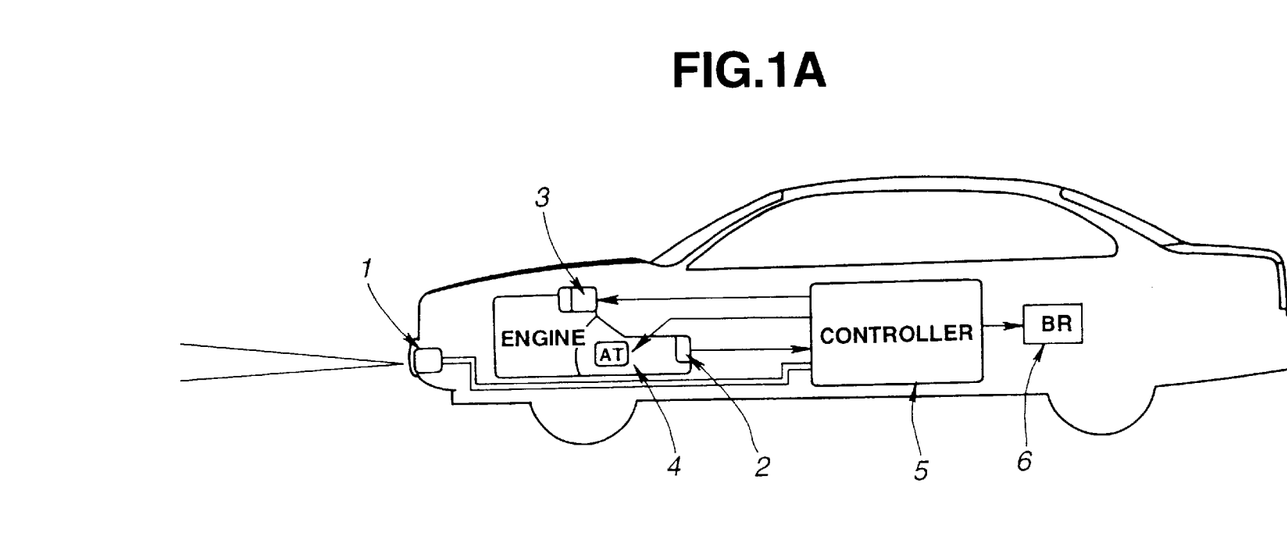
FIG. 1A is a schematic configuration view of a vehicular velocity control apparatus in a first preferred embodiment according to the present invention.

FIG. 1A shows an explanatory view of an automotive vehicle to which a vehicular velocity control apparatus in a first preferred embodiment according to the present invention is applicable.

In FIG. 1A, an inter-vehicle distance sensor 1 is a sensor head of a radar type such that a laser beam is scanned over a given scanning angle in a width-wise direction (a leftward-and-rightward direction at a forward detection zone to the vehicle) and the reflected beams are received from an object(s) present in, generally, the forward detection zone defined by the scanning angle to detect the object(s), for example, a preceding vehicle.

It is noted that an electromagnetic wave or ultra-sonic wave may be used as a medium in place of the laser beam.

The inter-vehicle distance sensor 1 is exemplified by a U.S. Pat. No. 5,710,565 issued on Jan. 14, 1998.

A vehicular velocity sensor 2 is attached onto an output shaft of an automatic transmission 4 to output a pulse train signal whose period is in accordance with a revolution velocity of the output shaft of the vehicular automatic transmission 4.

It is noted that the automatic transmission 4 may be a continuously variable transmission (so-called, CVT).

A throttle valve portion actuator 3 (constituted by, for example, a DC motor) actuates a throttle valve of an engine associated with the automatic transmission 4 to be opened or closed in response to a throttle valve opening angle command so as to vary an intake air quantity in an intake air passage of the engine to be supplied to the engine so as to adjust an engine output torque.

The automatic transmission 4 varies a gear ratio (speed ratio in the case of the CVT) in accordance with the vehicular velocity Vs and the engine output torque described above.

A vehicular brake system 6 is constituted by a negative-pressure booster type actuator and serves to develop a brake force to be applied to the vehicle shown in FIG. 1A.

Figure 1B:
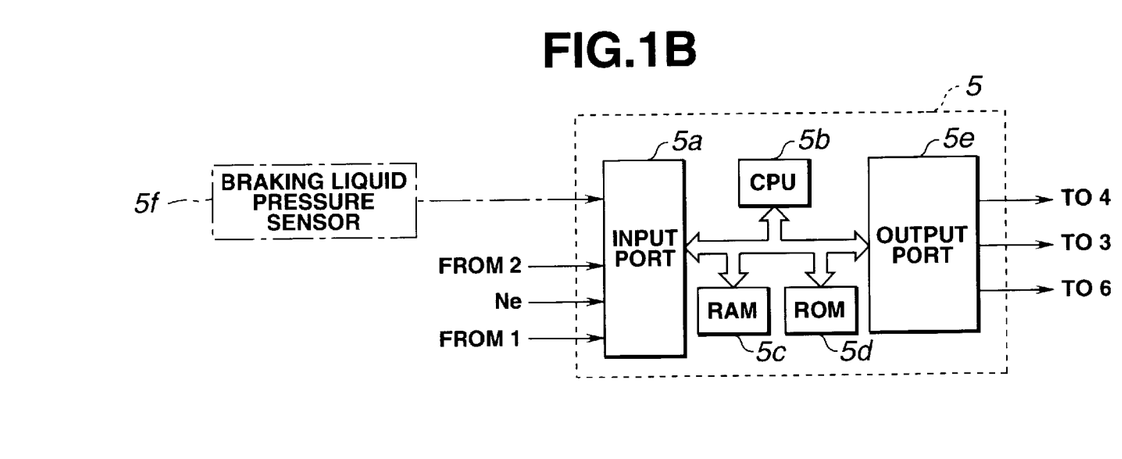
FIG. 1B is a schematic circuit block diagram of the vehicular velocity control apparatus in the first preferred embodiment.

A follow-up run controller 5 includes a microcomputer and its peripheral circuitry, as shown in FIG. 1B.

The microcomputer of the controller 5 includes generally a CPU (Central Processing Unit), a RAM (Random Access Memory), a ROM (Read Only Memory), an Input Port, an Output Port, and a common bus, as shown in FIG. 1B.

The follow-up run controller 5 calculates a target vehicular velocity on the basis of a detected value of the inter-vehicle distance between the vehicle and a preceding vehicle (another vehicle which is running ahead of the vehicle at the same traffic lane) and controls an operation of the throttle valve position actuator 3, the gear ratio of the automatic transmission 4, and a brake liquid pressure of the brake system 6.

Figure 2A:
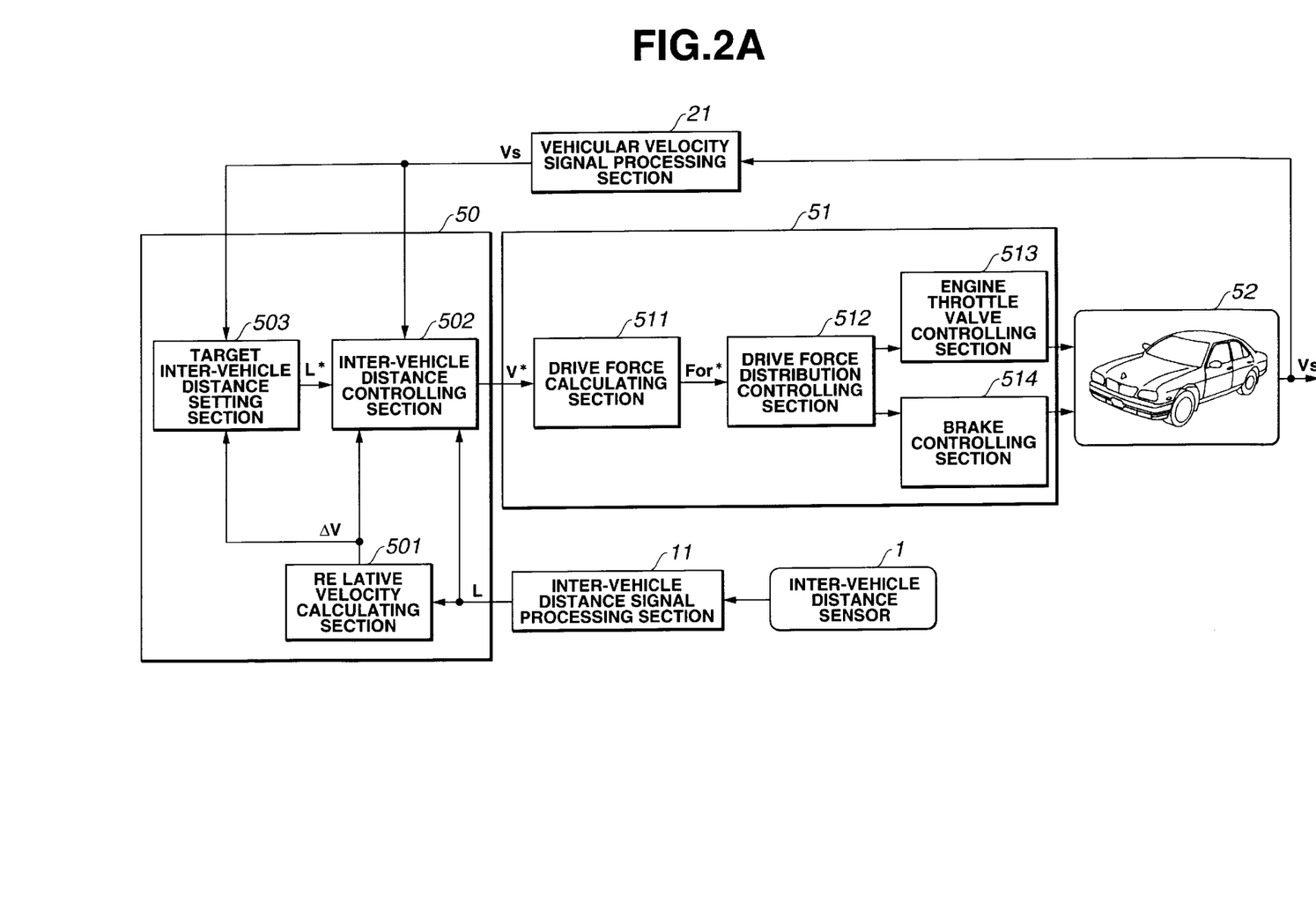
FIG. 2A is a functional block diagram of a follow-up run controller shown in FIGS. 1A and 1B.

The follow-up run controller 5 constitutes control blocks 11, 21, 50, and 51 shown in FIG. 2A in terms of software. The details of the function of the follow-up run controller 5 will be described below.

FIG. 2 shows a functional block diagram of the follow-up run controller 5 in the first preferred embodiment according to the present invention.

In FIG. 2, a measured distance signal processing block 11 measures a time duration from a time at which the laser beam is radiated to scan over the forward detection zone from the inter-vehicle distance sensor 1 to a time at which the reflected laser beam to calculate the inter-vehicle (spatial) distance from the vehicle in which the apparatus shown in FIG. 1A is installed to the preceding vehicle.

It is noted that if a plurality of such preceding vehicles as described above are trapped by the inter-vehicle distance sensor 1, one of the preceding vehicles to be followed is specified and its inter-vehicle distance to be specified as the preceding vehicle is calculated.

Since such a method of selecting the specified one of the preceding vehicle is well known, the detailed description thereof will herein be omitted.

It is noted that the selection method is exemplified by a U.S. Pat. No. 5,710,565 issued on Jan. 20, 1998.

A vehicular velocity measuring block 21 measures a period of the vehicular velocity pulses from the vehicular velocity sensor 2 to derive the vehicular velocity Vs.

A preceding vehicle follow-up run control block 50 includes: a relative velocity calculating section 501; an inter-vehicle distance controlling section 502; and a target inter-vehicle distance setting section 503.

The preceding vehicle follow-up run controlling block 50 calculates a target inter-vehicle distance L* and a target vehicular velocity V* on the basis of the inter-vehicle distance L and the vehicular velocity Vs. The relative velocity calculating section 501 calculates a relative velocity ΔV to the preceding vehicle on the basis of the actual inter-vehicle distance L detected by the measured distance signal processing block 11.

The inter-vehicle distance controlling section 502 calculates the target inter-vehicle distance V* to make the inter-vehicle distance L substantially equal to the target inter-vehicle distance L* with the relative velocity ΔV taken into consideration.

The target inter-vehicle distance setting section 503 sets the target inter-vehicle distance L* in accordance with the vehicular velocity of the preceding vehicle $V_T$ or the vehicular velocity Vs.

The vehicular velocity controlling section 51 includes a driving force calculating section 51; a driving force distribution controlling section 512; a throttle (valve) controlling section 513; and a brake (system) controlling section 514.

The vehicular velocity controlling section serves to control the vehicular driving or brake force and the gear ratio of the automatic transmission 4 to make the vehicular velocity Vs substantially equal to the target vehicular velocity V*. The driving force calculating section 511 calculates a target driving force For* to make the vehicular velocity Vs substantially equal to the target vehicular velocity V*.

The driving force distribution controlling section 512 serves to distribute the target driving force For* into the engine driving force (corresponding to a target throttle valve opening angle Thr*) and the brake force (corresponding to a target braking liquid pressure Pbrk*), these target variables being outputted to the throttle valve controlling section 513 and the brake controlling section 514, respectively.

The throttle valve controlling section 513 serves to adjust an opening angle of the throttle (valve) actuator 3 in accordance with the target throttle valve opening angle Thr*. On the other hand, the brake controlling section 514 serves to adjust the brake liquid pressure of the vehicular brake system 6 in accordance with the target braking liquid pressure Pbrk*.

Next, an inter-vehicle distance control system and a vehicular velocity control system in the vehicular velocity controlling apparatus in the first preferred embodiment will be described below.

<<Inter-vehicle distance control system>>

This control system is designed using a state feedback (a regulator) since this control system is a one-input-and-two-output system in which two target values of the inter-vehicle distance and the relative velocity are controlled by a single input (viz., the target vehicular velocity).

State variables of this control system $x_1$ and $x_2$ are defined in the following equations (1) and (2).

$$x_1 = V_T - Vs \tag{1}$$

$$x_2 = L^* - L \tag{2}$$

In the equations (1) and (2), $V_T$ denotes the vehicular velocity of the preceding vehicle, Vs denotes the vehicular velocity of the vehicle to be controlled, L* denotes the target inter-vehicle distance, and L denotes the actual inter-vehicle distance.

In addition, a control input (an output of the controller is ΔV* and is defined in the following equation (3).

$$\Delta V^* = V_T - V^* \tag{3}$$

The inter-vehicle distance L is defined as follows:

$$L = \int (V_T - Vs) dt + L_0 \tag{4}$$

In the equation (4), $L_0$ denotes an initial value of the inter-vehicle distance.

In a vehicular velocity servo system, the actual vehicular velocity Vs can, for example, be approximated in a first-order lag to the target vehicular velocity V* as follows:

$$Vs=1/(1+\tau v\ S)V^* \tag{5}$$

In the equation (5), τv denotes a time constant of the vehicular velocity servo system and S denotes a differential operator (S=d/dt).

Suppose that the vehicular velocity of the preceding vehicle $V_T$ is constant. The following equation (6) can be derived.

$$\dot{x}_1 = -1/\tau v \cdot x_1 + 1/\tau v \cdot \Delta V^* \tag{6}$$

Furthermore, suppose that the target inter-vehicle distance L* is constant. The following equation (7) can be derived from the equations (3) and (4).

$$\dot{x}_2 = -(V_T - VS) = -x_1 \tag{7}$$

Hence, the state equation of this system can be described in an equation (8) shown in Table 1.

If the control input $\mu(\Delta V^*)$ is given as $\mu$=FX F=[fv fd] - - - (9), the state equation of the system in which a state feedback loop is carried out can be represented as follows:

$$\dot{x}=(A+BF)X \tag{10}$$

In addition, the state equation can also be given as in an equation (11) shown in Table 1.

A characteristic equation of the system can be represented as follows:

$$|sI-A'|=s^2+(1-fv)/\tau v\ S+fd/\tau v=0 \tag{12}$$

Control gains fd (for the inter-vehicle distance control system) and fv (for the vehicular velocity control system) are set so that characteristics to make the inter-vehicle distance L converge into the target inter-vehicle distance L* and to make the relative velocity ΔV converge into zero give desired characteristics.

That is to say, $S^2+(1-fv)/\tau v\cdot S+fd/v=S^2+2\xi\omega n\ S+\omega n^2=0$ - - - (13), wherein ξ denotes a damping factor, ωn denotes a specific angular frequency. fv=1−2ξωn·τv - - - (14) and fd=ωn²·τv - - - (15).

Hence, the target vehicular velocity V* to perform the inter-vehicle distance control can be derived as follows from the equations (3) and (9).

$$V^*=V_T-\Delta V^*$$

$$=(1-fv)\Delta V+fd(L^*-L)+Vs \tag{16}$$

wherein $V_T$=Vs−ΔV.

Vehicular Velocity Control System

The vehicular velocity control system is, for example, constituted by a robust compensator which is a kind of a disturbance estimator and a model matching compensator which makes a whole system response characteristic substantially equal to a response characteristic of a reference model in order to provide a control system which is robust to an external disturbance such as a variation in a road gradient. The vehicular velocity control system is designed using a robust model matching technique.

Figure 3:
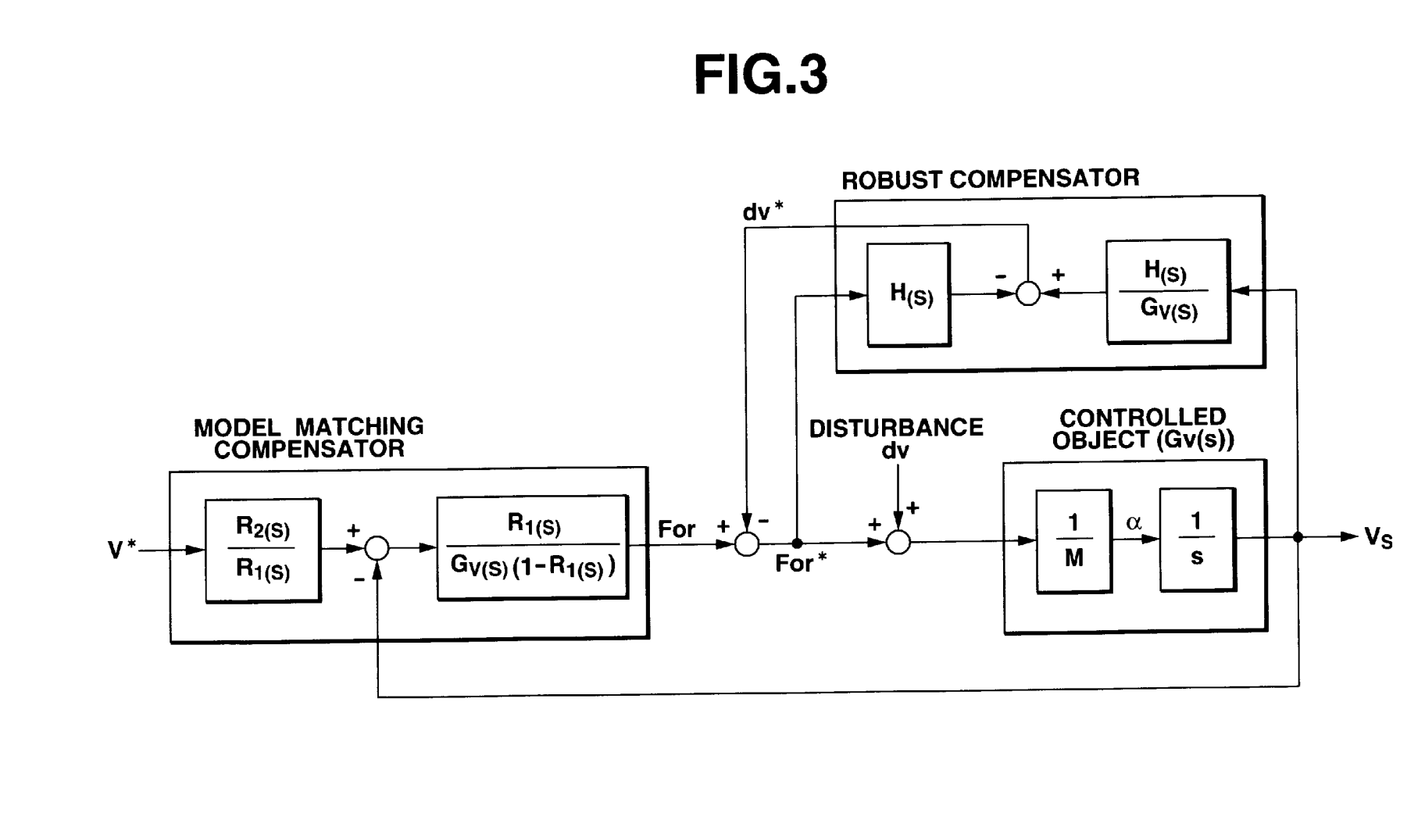
FIG. 3 is a functional block diagram of a vehicular velocity control apparatus in a second preferred embodiment.

FIG. 3 shows control block diagram of the vehicular velocity control system in the vehicular velocity control apparatus in the first preferred embodiment.

The robust compensator serves to estimate and correct the disturbance such as a modeling error of an object to be controlled (viz., the vehicle to be controlled) and a running resistance. Therefore, the robust compensator can constitute the control system which makes the actual vehicular characteristics substantially equal to a linear model Gv(s).

In FIG. 3, H(s) denotes a transfer function of a robust filter to determine a disturbance characteristic elimination performance.

The robust filter can be set as follows:

$$H(s)=1/(1+\tau c\ S) \tag{17}$$

wherein τc denotes a time constant.

The model matching compensator serves to determine response characteristic on system input and output through a reference model $R_2(S)$ of a feed forward portion and to determine the disturbance elimination performance and stability through a reference model $R_1(S)$ of a feedback portion.

For example, the model matching compensator is constituted by a robust filter which can be expressed as in the following equation (18).

$$R_1(S)=1/(1+T_1S) \tag{18, and}$$

$$R_2(S)=1/(1+T_2S) \tag{19}$$

The vehicular linear approximation model Gv(S) is an integration characteristic as given in the following equation (20).

$$Gv(S)=1/MS \tag{20}$$

wherein M denotes a vehicular weight.

From the above-described equations (1) through (20), a target driving force For* can be derived as follows:

That is to say, $$For(S)=R_1(S)/\{Gv(S)(1-R_1(S))\}\{R_2(S)/R_1(S)\ V^*-V\}=M/T_1\{(1+T_1S)\}/\{1+T_2S\}V^*-V\} \tag{21}$$

Then, an equation (22) shown in Table 1 can be derived.

It is noted that a negative target driving force—For* means the target brake force and when the target brake force is recited in the whole specification, the target brake force is included in the sense of the term.

Figure 4:
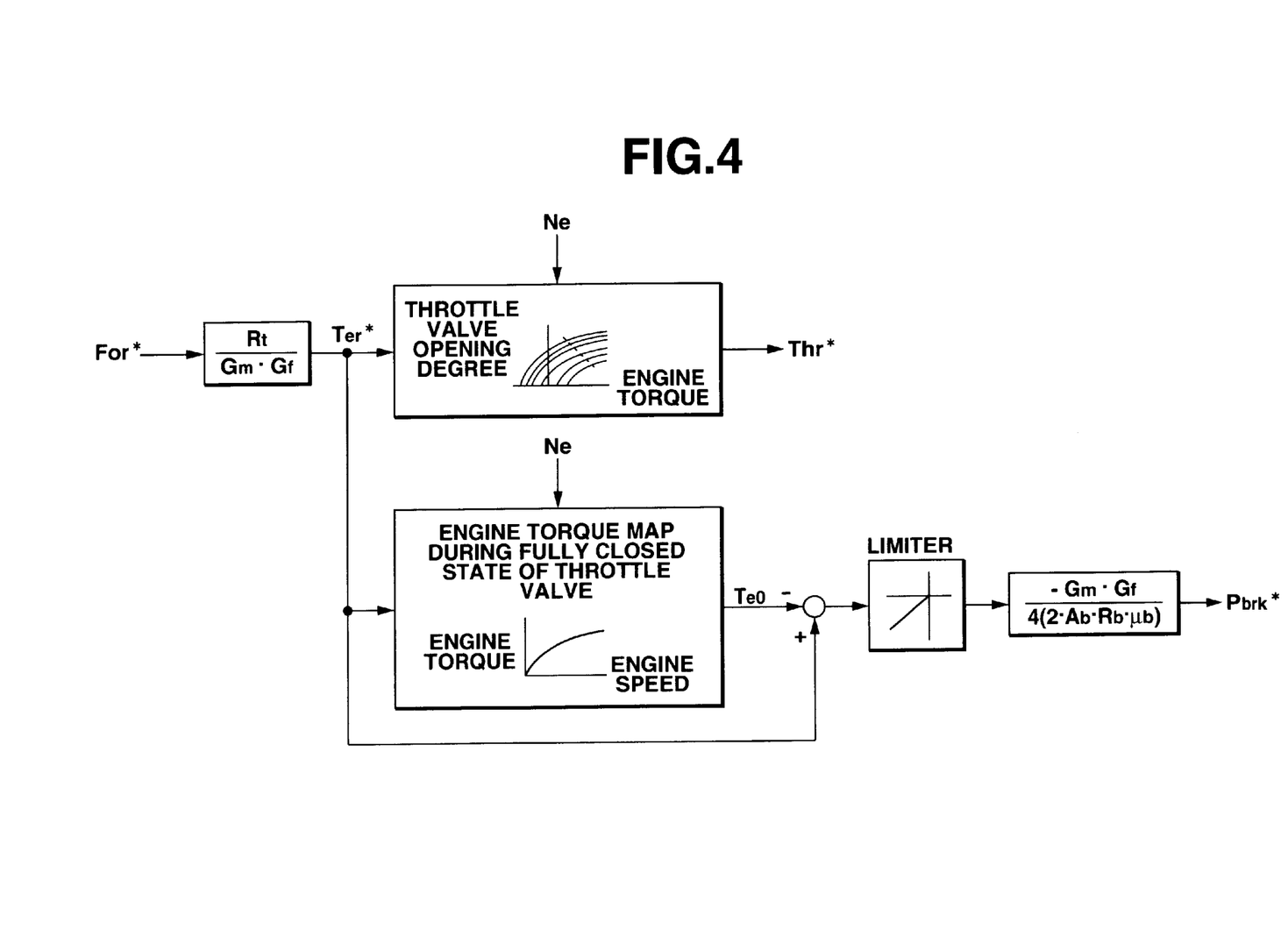
FIG. 4 is a functional block diagram of the follow-up run controller shown in FIGS. 1A and 1B for explaining a calculation method of a target throttle valve opening angle Thr* and a target braking liquid pressure Pbrk* in the first preferred embodiment.

FIG. 4 shows a method of calculating a target throttle valve opening angle Thr* and a target braking liquid pressure Pbrk*.

In FIG. 4, the follow-up run controller converts the target engine torque Ter* from the target driving force For* from the target driving force For* into the following equation.

$$Ter^*=Rt/(Gm\ Gf)For^* \tag{23}$$

In the equation (23), Rt denotes an effective radius of a tire of a representative tire wheel of the vehicle, Gm denotes a gear ratio of the automatic transmission 4, and Gf denotes a final gear ratio.

It is noted that a negative target engine torque Ter* is a brake torque and is achieved by means of an engine brake torque during a full close operation of the throttle valve in the case of the first preferred embodiment. However, in a case where the brake torque becomes insufficient only through the engine brake torque, a mechanical brake through the vehicular brake system 6 is used together with the engine brake torque.

The target throttle valve opening angle Thr* corresponding to the target engine torque Ter* and the engine speed Ne is derived by using a table look-up technique for a non-linear compensation map on the opening angle of the throttle valve on the basis of a preset engine torque and a preset engine speed Ne [rpm].

On the other hand, the target braking liquid pressure Pbrk* is calculated as follows when the target throttle valve opening angle Thr as the result of calculation indicates zero. That is to say, the engine torque Te0 during the full close state of the throttle valve with respect to the preset engine speed is derived from the engine torque map shown in FIG. 4.

The target braking liquid pressure Pbrk* is calculated by subtracting the engine torque Te0 during the full close operation of the throttle valve from the target engine torque Ter*.

That is to say, $$Pbrk^*=-GmGf/4(2\ Ab\ Pb\ \mu b)\ (Ter^*-Te0) \qquad (24).$$

In the equation (24), Ab denotes a wheel cylinder area, Rb denotes an effective radius of a brake disc, and $\mu b$ denotes a frictional coefficient of a brake pad.

Next, a method of preventing an occurrence of a brake fade phenomenon carried out by the vehicular velocity controlling apparatus in the first preferred embodiment will be described below.

In the vehicular velocity controlling apparatus described above, the negative target driving force is calculated to decelerate the controlled vehicle in each case where the inter-vehicle distance to the preceding vehicle becomes shortened and where the vehicle is running on a descending slope (downhill). At this time, if the deceleration force becomes insufficient only through the engine braking with the engine throttle valve fully closed, the mechanical brake through the vehicular brake system 6 is used together with the engine braking.

Especially, if the vehicle is running on such a relatively long and abrupt descending slope, a large negative driving force is required to maintain the inter-vehicle distance constant with an acceleration occurring due to a road surface gradient to the sea level reduced to give the negative acceleration.

Consequently, if there is a possibility of applying the mechanical brake to the road wheels for a long period of time. If the mechanical brake is applied to the road wheels for the long period of time, the vehicular brake system 6 becomes heated so that a braking distance becomes increased (so-called, a brake fade phenomenon occurs). Therefore, the brake force is reduced so that the inter-vehicle distance to the preceding vehicle cannot be maintained any more and an ill effect is given on a brake performance during a normal run (no preceding vehicle follow-up control is carried out).

In the first preferred embodiment, a continuous mechanical brake applying state through the brake system n 6 is detected or estimated. If there is a possibility of generating the fade phenomenon, the follow-up run control is released to prevent the fade phenomenon from occurring.

Such a mechanical brake applying state as the possibility of occurring in the near future the brake fade phenomenon is determined in the following procedure on the basis of a continuous time for which, for example, the target brake liquid pressure Pbrk* is outputted.

First, a time for a temperature of a brake pad to reach to about ½ the temperature at which the fade phenomenon occurs is defined and is a reference time. A representative value of the reference time is derived by experimentally measuring a temperature rise when the brake liquid pressure is constant and the constant brake liquid pressure is applied to the brake system 6 to apply the brake force to the road wheels.

Figure 5:
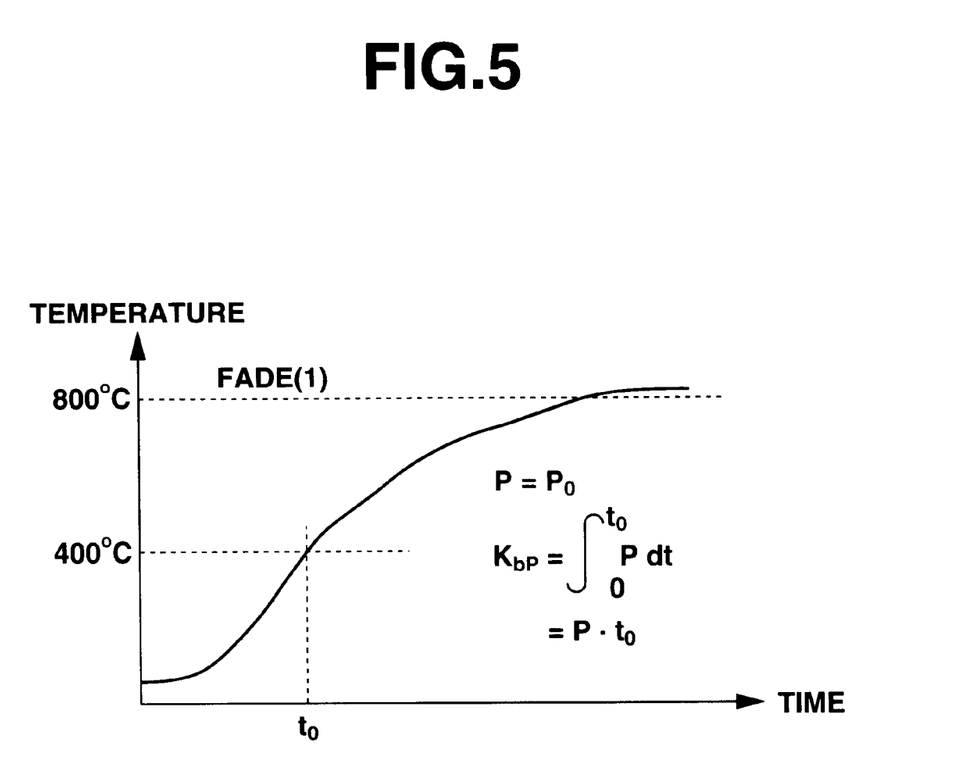
FIG. 5 is an explanatory view for explaining a method of determining a reference value KbP on a target mechanical braking manipulated variable.

For example, as shown in FIG. 5, since a fade temperature of the brake pad made of a generally available material is from 700° C. to 800° C., the time to rise the brake pad temperature up to half 700° C. to 800° C. (viz., 400° C. is measured and the representative value on the time measured is assumed to the reference time t0.

In addition, the braking liquid pressure P during the above measurement for the reference time t0 uses a braking liquid pressure P0 such as to generate the vehicular deceleration from, for example, 0.3 G to 0.5 G normally used.

Next, the braking liquid pressure (P=P0) used for the measurement of the reference time t0 is integrated for the reference time t0 to determine a reference value Kbp on a continuous brake manipulated variable.

A heat generated on the brake pad is proportional to the brake force and a brake time duration and the brake force is proportional to the braking liquid pressure. If a high liquid pressure is continuously applied, the temperature rise in the brake pad becomes fast. If a low liquid pressure is continuously applied, the temperature rise inn the brake pad in accordance with the brake force can be predicted.

In order to actually determine the occurrence in the brake fade phenomenon during the follow-up run control, the follow-up run controller 5 integrates the target brake liquid pressure Pbrk* during the follow-up run control with respect to time so that the integrated value is compared with the above-described reference value Kbp.

If the integrated value bP of the target braking liquid pressure Pbrk* becomes larger than the reference value Kbp, the follow-up run controller 5 determines that there is a great possibility that the brake fade phenomenon would occur in the near future and releases the follow-up run control.

Figure 6:
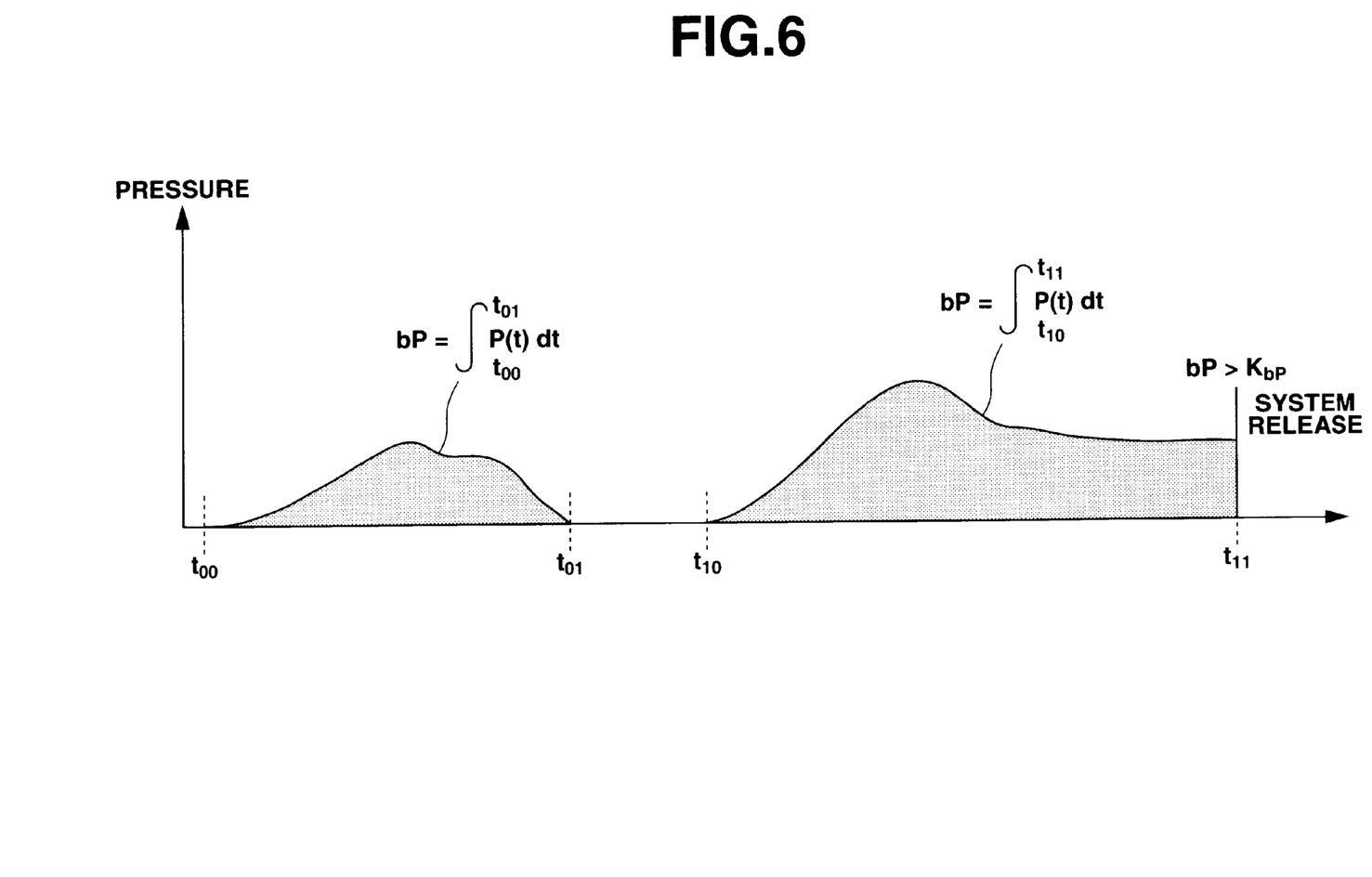
FIG. 6 is an explanatory view for explaining a method of determining an occurrence of a brake fade phenomenon during an execution of a follow-up run control in the follow-up run controller of the first preferred embodiment shown in FIGS. 1A and 1B.

It is noted that the time integration of the target brake liquid pressure Pbrk* is carried out only when the target brake liquid pressure Pbrk* is not zero. Then, the integration value bP is reset when the target braking liquid pressure Pbrk* is in excess of zero at the time duration t00 to t01 and t10 to t11, the target braking liquid pressure Pbrk* is integrated with respect to time for each time interval t00 to t01 and t10 to t11. If the integration value bP is in excess of the reference value Kbp, the follow-up run control is released.

In an example shown in FIG. 6, at a time point t11, the follow-up run control is released since the time integration value bP on the target braking liquid pressure is in excess of the reference value KbP. It is noted that at the time point t01 the target braking liquid pressure Pbrk* indicates zero. When Pbrk*=01, the integration value bP is once reset. Then, the time integration of the target braking liquid pressure Pbrk* is resumed from the time point t10 at which the time integration of the target braking liquid pressure Pbrk* is resumed. After the time integration value of the braking liquid pressure Pbrk* is larger than the reference value Kbp and the follow-up run control is released determining that there is a great possibility that the fade phenomenon occurs, the engine is at least once stopped and the recovery to the follow-up run control is not enabled until the engine is restarted.

Figure 7:
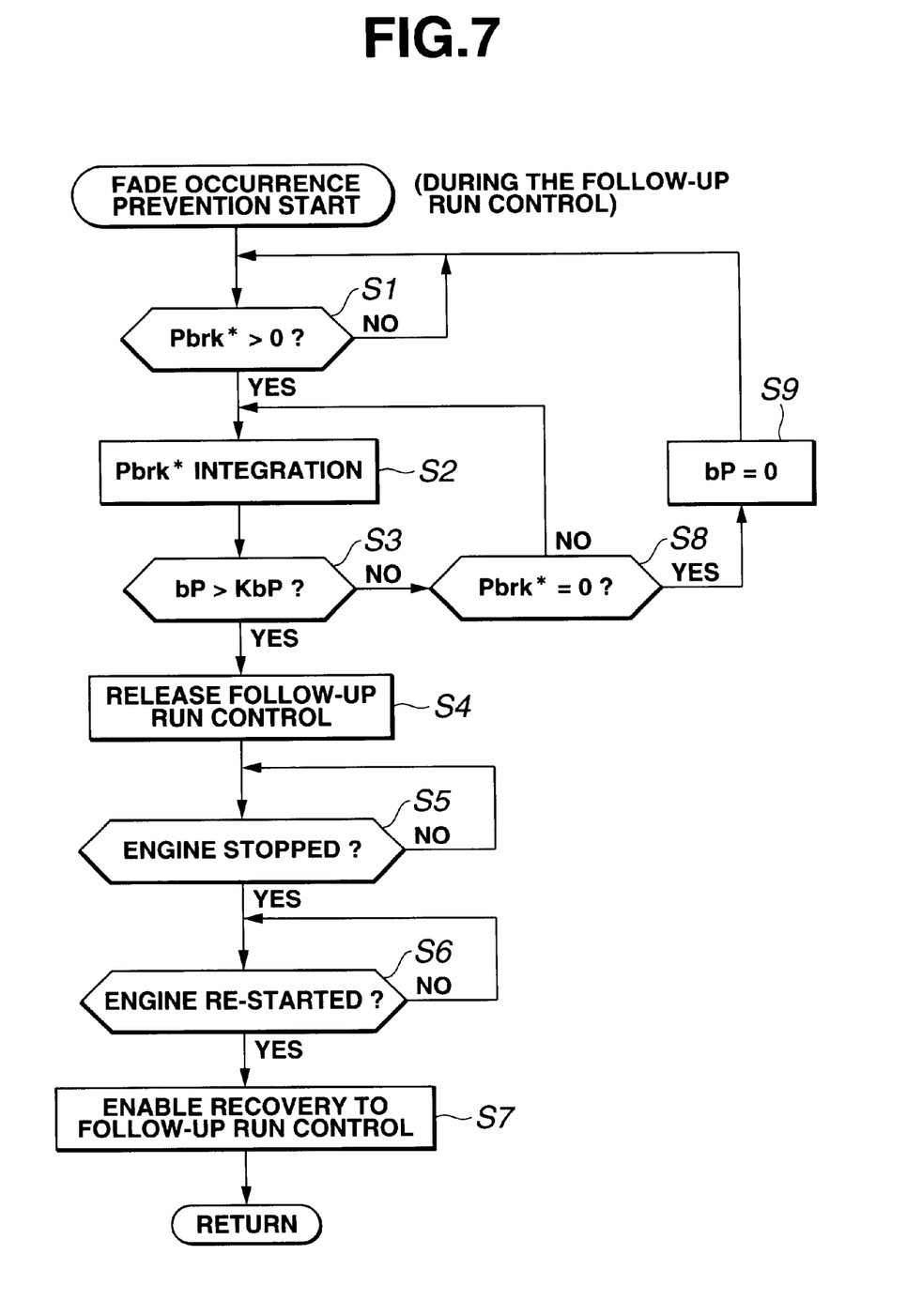
FIG. 7 is an operational flowchart for explaining a prevention procedure on the occurrence of the brake fade phenomenon executed in the follow-up run controller shown in FIGS. 1A and 1B.

FIG. 7 shows an operational flowchart executed in the first preferred embodiment of the vehicular velocity controlling apparatus for explaining the fade phenomenon occurrence prevention procedure.

The follow-up run controller 5 repeatedly executes a routine shown in FIG. 7 as a timer interrupt routine.

That is to say, at a step S1, the CPU of the follow-up run controller 5 determines if the target braking liquid pressure Pbrk* exceeds zero. If Pbrk*>0, the routine goes to a step S2. At the step S2, the follow-up run controller 5 integrates the target braking liquid pressure Pbrk* with respect to time. It is noted that the target braking liquid pressure Pbrk* is calculated in the way described above using another program.

At a step S3, the follow-up run controller 5 confirms the time integrated value bP for the target braking liquid temperature Pbrk* with the reference value KbP.

If the integration value bP is in excess of the reference value kbP, the routine goes to a step S4 in which the follow-up run control is released. Specifically, the release of the follow-up run control means the output of the target engine throttle valve opening angle Thr* and the target braking liquid pressure Pbrk* are zeroed.

In addition, at the next step S5, the follow-up run controller 5 confirms whether an ignition key switch (not shown) is operated to stop the engine 3.

If the engine 3 is stopped, the routine goes to a step S6. At the step S6, the follow-up run controller 5 confirms whether the engine 3 is restarted, the routine goes to a step S7. At the step S7, the follow-up run controller 5 enables the recovery of the follow-up run.

On the other hand, if the time integration value bP of the target braking liquid pressure Pbrk* is equal to or smaller than the reference value KbP, the routine goes to a step S8. At the step S8, the follow-up run controller 5 confirms whether the target braking liquid pressure Pbrk* indicates zero. If Pbrk*=0 at the step S8, the routine goes to a step S9 in which the time integration value bP on the target braking liquid pressure is reset to zero and the routine is returned to the step S1 to repeat the above-described procedure. If Pbrk*≠0 at the step S8, the routine is returned to the step S2 to continue the time integration on the target braking liquid pressure Pbrk*.

As described above, the reference value KbP on the continuous brake manipulated variable is set on the basis of the temperature rise time duration of the brake pad (although the brake pad is installed for each road wheel, this brake pad is a representative one for the respective road wheels) when the constant braking liquid pressure is applied, the reference value being a measure for a determination of the occurrence in the brake fade phenomenon. Then, if the time integration value bP of the target braking liquid pressure Pbrk* during the follow-up run control is in excess of the reference value KbP, the controller 5 determines that there is the great possibility of the occurrence of the brake fade phenomenon and is operated to release the follow-up run control.

Hence, in a case where such the follow-up run control as to follow up the preceding vehicle is carried out while the preceding vehicle is carried out while the simultaneous operations of the engine braking and of the vehicular brake through the vehicular brake system 6 are advanced, the vehicular velocity controlling apparatus can prevent the occurrence of the brake fade phenomenon while the mechanical brake is continuously acted upon for the long period of time.

It is noted that the reference value KbP on the continuous brake manipulated variable may be corrected in accordance with the road surface gradient.

For example, when the vehicle is running on the abrupt descending slope having a steep road gradient, a frequency of applying the mechanical brake becomes increased even when the vehicle is running in the normal running mode in which no follow-up run control is executed. Therefore, it is required to leave a sufficient margin of the brake performance even after the follow-up run control is released. To meet this requirement, the reference value KbP on the continuously brake manipulated variable previously set is corrected to become smaller so as to release the follow-up run control at an earlier time. The road surface gradient may directly be measured by means of a gradient meter or may be detected from that on a present location of the vehicle through a car navigation system.

In addition, in the above-described first embodiment, the determination of the brake fade phenomenon is based on the time integration of the target braking liquid pressure Pbrk* when the target braking liquid pressure Pbrk* is not zero. However, with a cooling of the brake pad taken into consideration, the integrated value may not be reset even if the target braking liquid pressure Pbrk* temporarily indicates zero and the determination of the occurrence of the fade phenomenon may be based on an accumulated value of the time integration value of the target braking liquid pressure Pbrk* within a predetermined period of time.

Figure 2B:
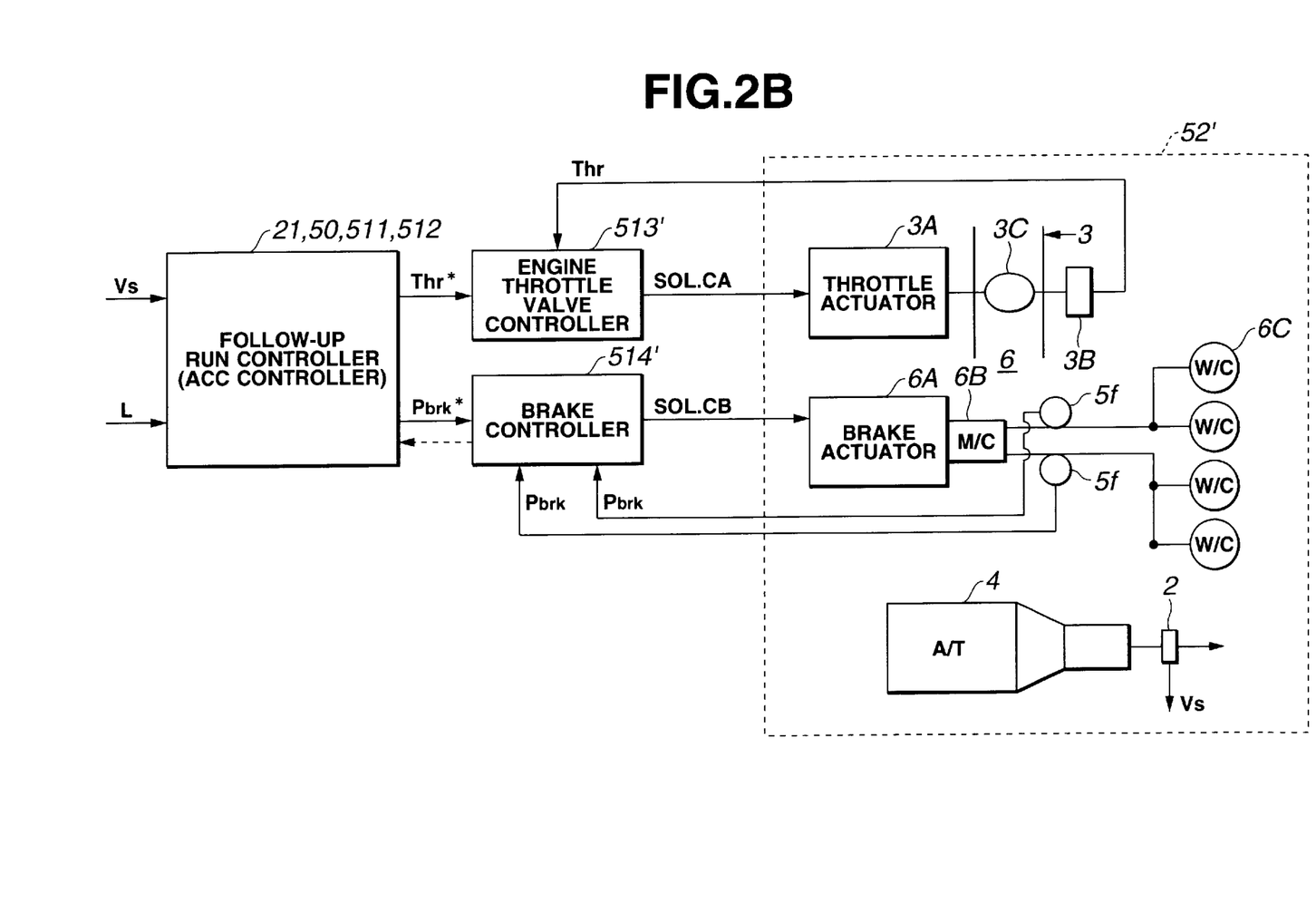
FIG. 2B is a circuit block diagram of the vehicular velocity control apparatus in a second preferred embodiment according to the present invention.

Furthermore, FIG. 2B shows a system configuration of a second preferred embodiment of the vehicular velocity controlling apparatus.

As shown in FIG. 2B, the follow-up run controller 5 is separate from an engine throttle valve controller 513' and a brake controller 514'. In the second embodiment, the actual braking liquid pressure Pbrk is detected by means of each braking liquid pressure sensor 5f disposed in a corresponding working liquid pressure passage between a master cylinder M/C 6B and a plurality of wheel cylinders W/C 6C of the vehicular brake system 6 and the detected braking liquid pressure Pbrk (an average value of each braking liquid pressure may be used) is integrated with respect to time in the same manner as the target braking liquid pressure Pbrk* as described in the first embodiment.

The follow-up run controller 5 (21, 50, 511, 512) refers to the detected braking liquid pressure Pbrk to calculate the time integration thereof. It is noted that a reference numeral 52' shown in FIG. 2B corresponds to the vehicle 52 to be controlled shown in FIG. 2A except that the braking liquid pressure sensor(s) 5f is (or are) disposed in the braking liquid pressure passages, a reference numeral 3A denotes a throttle actuator constituted by, for example, a DC motor, 3C denotes the engine throttle valve, 3B denotes an opening angle sensor (for example, a potentiometer) to detect the opening angle of the throttle valve 3C, 6A denotes a brake actuator to actuate the master cylinder in response to a SOL.CB (solenoid current) signal from the brake controller 514'. The other structures in the second embodiment are generally the same as those in the first embodiment.

In the second embodiment, the detected value of the braking liquid pressure Pbrk is integrated with respect to the time duration and the time integrated (integration) value of the detected braking liquid pressure is compared with the reference value KbP used in the first embodiment.

Hence, the target braking liquid pressure Pbrk* described at the steps S1, S2, and S8 shown in FIG. 7 are replaced with Pbrk in the second embodiment.

Although the follow-up run controller 7 executes the fade prevention procedure shown in FIG. 7, the brake controller 514' may execute the fade prevention procedure shown in FIG. 7. In this alternative case, the brake controller 514' issues a release request command to the follow-up run controller (also called, ACC controller 21, 50, 511,and 512 to output zero target braking liquid pressure Pbrk*.

It is noted that the reference value KbP described above is experimentally measured as, for example, 15(MPa)×3 (Seconds)×10 (braking number of times)=450 (MPa), and the reference time t0 shown in FIG. 5 is, for example, 150 seconds since a maximum braking liquid pressure used in the follow-up run controller (ACC controller) shown in FIG. 2B is 3 MPa.

It is also noted that the accumulated value of the target braking liquid pressure Pbrk* is compared with the same reference value KbP on the continuously brake manipulated variable used in the flowchart shown in FIG. 5 and the predetermined temperature is approximately 400° C.

The entire contents of Japanese Patent Applications No. Heisei 11-123782 (filed in Japan on Apr. 30, 1999) are herein incorporated by reference. Although the invention has been described above by reference to certain embodiments of the invention, the invention is not limited to the embodiments described above. Modifications and variations of the embodiments described above will occur to those skilled in the art in the light of the above teachings. The scope of the invention is defined with reference to the following claims.

TABLE 1

$$\frac{d}{dt}\begin{bmatrix} \dot{x}_1 \\ \dot{x}_2 \end{bmatrix} = \begin{bmatrix} -1/\tau_v & 0 \\ -1 & 0 \end{bmatrix}\begin{bmatrix} x_1 \\ x_2 \end{bmatrix} + \begin{bmatrix} 1/\tau_v \\ 0 \end{bmatrix}\Delta V^* \quad (8)$$

$$A' = (A+BF) = \begin{bmatrix} (fv-1)/\tau_v & fd/\tau_v \\ 1 & 0 \end{bmatrix} \quad (11)$$

$$\begin{aligned} For^*(s) &= \frac{1}{1-H(s)}\left\{For(s)\frac{H(s)}{G_v(s)}V\right\} \\ &= \frac{1+\tau_c s}{\tau_c s}For(s) - \frac{M}{\tau_c}V \end{aligned} \quad (22)$$

What is claimed is:

1. A vehicular velocity control apparatus for an automotive vehicle, comprising:
   a first calculator to calculate a target vehicular velocity to make an actual inter-vehicle distance from the vehicle to another vehicle which is running ahead of the vehicle substantially equal to a target inter-vehicle distance;
   a second calculator to calculate a target vehicular driving force to make an actual vehicular velocity substantially equal to the target vehicular velocity;
   a first controller operated to control an engine output variable of a vehicular engine to make an actual engine output variable substantially equal to the target vehicular driving force;
   a second controller responsive to a negative target driving force to control a mechanical brake manipulated variable of a vehicular brake system to make a vehicular brake force substantially equal to the negative target vehicular driving force together with an operation of the first controller;
   a brake force integrator to integrate the mechanical brake manipulated variable of the vehicular brake system with respect to a time duration; and
   a follow-up run release controller to release a follow-up run control for the vehicle to follow up the other vehicle at the target inter-vehicle distance through the first and second controllers when an integration value of the mechanical brake manipulated variable with respect to a time duration by the brake force integrator is in excess of a preset reference value.

2. A vehicular velocity control apparatus for an automotive vehicle as claimed in claim 1, wherein the brake force integrator includes a target braking liquid pressure integrator to integrate a target braking liquid pressure for the vehicular brake system with respect to the time duration, the target braking liquid pressure corresponding approximately to a part of the negative target vehicular driving force to be exerted by the vehicular brake system.

3. A vehicular velocity control apparatus for an automotive vehicle as claimed in claim 1, further comprising a braking liquid pressure detector to detect a braking liquid pressure of the vehicular brake system and wherein the brake force integrator integrates a detected value of the braking liquid pressure detected by the braking liquid pressure detector with respect to the time duration, the braking liquid pressure corresponding to the mechanical brake manipulated variable.

4. A vehicular velocity control apparatus for an automotive vehicle as claimed in claim 2, wherein the preset reference value is an integration value of the braking liquid pressure for a temperature of a brake pad of the vehicular brake system to reach to a predetermined value when the vehicular brake system is operated with a predetermined braking liquid pressure.

5. A control apparatus for an automotive vehicle as claimed in claim 1, wherein the follow-up run release controller disables a recovery of the follow-up run control which has been released until the vehicular engine is re-started after the engine has been stopped.

\* \* \* \* \*